(12) United States Patent
Rhiger et al.

(10) Patent No.: US 9,702,988 B1
(45) Date of Patent: Jul. 11, 2017

(54) COMBINED NEUTRON AND GAMMA-RAY DETECTOR AND COINCIDENCE TEST METHOD

(71) Applicant: Raytheon Company, Waltham, MA (US)

(72) Inventors: David R Rhiger, Santa Barbara, CA (US); Justin Gordon Adams Wehner, Goleta, CA (US); Kelly Jones, Goletta, CA (US); Siddhartha Ghosh, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/989,590

(22) Filed: Jan. 6, 2016

(51) Int. Cl.
*G01T 3/08* (2006.01)
*G01T 1/24* (2006.01)

(52) U.S. Cl.
CPC ............... *G01T 3/08* (2013.01); *G01T 1/247* (2013.01)

(58) Field of Classification Search
CPC ............ G01T 7/00; G01T 3/08; H01L 31/115
See application file for complete search history.

(56) References Cited

U.S. PATENT DOCUMENTS

| | | | |
|---|---|---|---|
| 3,988,586 A | 10/1976 | Stuart | |
| 4,482,808 A * | 11/1984 | Tominaga | G01T 1/40 250/392 |
| 5,969,359 A | 10/1999 | Ruddy | |
| 6,218,668 B1 | 4/2001 | Luke | |
| 6,479,826 B1 * | 11/2002 | Klann | G01T 3/08 250/370.04 |
| 6,727,503 B1 * | 4/2004 | Gerstenmayer | G01T 1/24 250/367 |
| 7,164,138 B2 | 1/2007 | McGregor | |

(Continued)

FOREIGN PATENT DOCUMENTS

| | | |
|---|---|---|
| CA | 1044821 A1 | 12/1978 |
| EP | 1739460 A2 | 1/2007 |

(Continued)

OTHER PUBLICATIONS

G.W. Fraser, "Thermal neutron imaging," Proc. SPIE 2339, 287 (1995).

(Continued)

*Primary Examiner* — Kiho Kim
(74) *Attorney, Agent, or Firm* — Renner, Otto, Boisselle & Sklar, LLP (57) ABSTRACT

A method for detecting both gamma-ray events and neutron events with a common detector, where the detector includes a layer of semiconductor material adjacent one side of a glass plate and a Gd layer on an opposite side of the glass plate, between the glass plate and a layer of silicon PIN material to form an assembly that is bounded by electrodes, including a semiconductor anode on one side of the semiconductor layer, a cathode connected to the glass plate, and a Si PIN anode on a side of the Si PIN layer opposite the semiconductor anode. The method includes the steps of: (1) monitoring the electrical signal at each of the semiconductor anode and the Si PIN anode, and (2) comparing signals from the semiconductor anode and the SI PIN anode to differentiate between gamma-ray events and neutron events based on predetermined criteria.

20 Claims, 5 Drawing Sheets

(56) References Cited

U.S. PATENT DOCUMENTS

| | | | |
|---|---|---|---|
| 7,626,178 B2 | 12/2009 | Ivan | |
| 7,855,372 B2 | 12/2010 | McGregor | |
| 8,389,941 B2* | 3/2013 | Bendahan | G01T 1/167 250/363.02 |
| 2011/0266643 A1* | 11/2011 | Engelmann | G01T 3/08 257/429 |
| 2013/0284938 A1* | 10/2013 | Meng | G01T 1/247 250/370.09 |
| 2015/0053863 A1* | 2/2015 | Cao | G01T 3/08 250/370.05 |

FOREIGN PATENT DOCUMENTS

| | | |
|---|---|---|
| WO | 2006048871 A9 | 5/2006 |
| WO | 2013116241 A1 | 8/2013 |
| WO | 2013122652 A2 | 8/2013 |

OTHER PUBLICATIONS

R.E. Alvarez and C.C. Cao, Harmonex X-Ray Tutorial (1994), Aprend Technology.

G. De Geronimo, E. Vernon, K. Ackley, A. Dragone, J. Fried, P. O'Connor, Z. He, C. Herman, and F. Zhang, "Readout ASIC for 3D Position-Sensitive Detectors," IEEE Transactions on Nuclear Science, vol. 55, 1593 (2008).

P. Kandlakunta and L. Cao, "Gamma-Ray Rejection, or Detection, With Gadolinium as a Convertor," Rad. Protection Dosimetry, 151,586 (2012).

G. Bruckner, A. Czermak, H. Rauch, and P. Weilhammer, "Position sensitive detection of thermal neutrons with solid state detectors (Gd Si planar detectors)," Nucl. Instr. Meth. Phys. Res. A 424, 183 (1999).

T. Aoyama, Y. Oka, K. Honda, and C. Mori, "A neutron detector using silicon PIN photodiodes for personal neutron dosimetry," Nucl. Instr. Meth. Phys. Res. A 314, 590 (1992).

A. Breskin, R. Chechik, A. Gibrekhterman, A. Akkerman, V. Dangendorf, and A. Demian, "Large area, high resolution thermal neutron imaging detectors," Proc. SPIE 2339, 281 (1995).

D.A. Abdushukurov, A.A. Dzhuraev, S.S. Evteeva, P.P. Kovalenko, V.A. Leskin, V.A. Nikolaev, R.F. Sirodzhi, and F.B. Umarov, "Model calculation of efficiency of gadolinium-based converters of thermal neutrons", Nucl. Instr. Meth. Phys. Res. B 84, 400 (1994).

* cited by examiner

FIG. 5

COMBINED NEUTRON AND GAMMA-RAY DETECTOR AND COINCIDENCE TEST METHOD

FIELD OF THE INVENTION

This invention concerns a detector for both neutrons and gamma rays and a corresponding method for improving the detection of neutrons and gamma rays in a common detector.

BACKGROUND

Radiation detectors have many important uses in nuclear energy, physics research, materials science, and radiation safety, among others. Two types of radiation often of interest are neutrons and gamma rays.

One way to detect these types of radiation uses a scintillator material called CLYC (which is Cs2LiYCl6:Ce3+), typically in the form of a crystal. Like other scintillators, a CLYC crystal produces a flash of light when capturing a gamma ray. The flash of light can be turned into an electrical signal for further analysis. A CLYC crystal also can be used to capture neutrons through a nuclear reaction with lithium (Li) atoms in the crystal, and also produces a flash of light due to the energetic particles from the neutron-lithium reaction. Unfortunately, these crystals can be difficult to grow and thus are quite expensive, and it can be difficult to distinguish the flashes of light due to neutrons from the flashes of light due to gamma rays.

Another way to detect these types of radiation relies on the capture of neutrons by cadmium (Cd) in crystals of cadmium-zinc-telluride (CdZnTe) (often abbreviated CZT). CZT also is used in detectors for gamma-ray radiation. The neutron-cadmium reaction produces gamma rays that can be detected by pulses of electrons from the CZT, but the sensitivity is low and it is difficult to distinguish whether the pulse of electrons was caused by a neutron or a gamma ray.

SUMMARY

The present invention provides a combined neutron and gamma-ray detector and method that is sensitive to both neutrons and gamma-rays in the same detector, improves the ability to distinguish between the two kinds of radiation, is compact, requires relatively little power, and is relatively inexpensive compared to current radiation detection devices and methods.

More specifically, the present invention provides a method for detecting both gamma-ray events and neutron events with a common detector that includes a layer of semiconductor material adjacent a glass plate, a gadolinium (Gd) converter layer adjacent an opposite side of the glass plate, and a layer of silicon PIN material in contact with the Gd converter layer on an opposite side of the glass plate to form an assembly that is bounded by electrodes, including a semiconductor anode on one side of the semiconductor layer, a cathode connected to the glass plate, and a Si PIN anode on a side of the Si PIN layer opposite the semiconductor anode. The method includes the steps of: (1) monitoring the electrical signal at each of the semiconductor anode and the Si PIN anode, and (2) comparing signals from the semiconductor anode and the SI PIN anode to differentiate between gamma-ray events and neutron events based on predetermined criteria.

The method may further include one or more of the steps of establishing an electric field within the semiconductor layer and the Si PIN layer, and providing a common gamma-ray and neutron detector with a controller connected to the first and second anodes and the cathode, the controller including a processor and a memory.

The present invention also provides a detector for both gamma-rays and neutrons that includes (a) a semiconductor layer including a semiconductor material suitable for capturing gamma-rays, (b) a glass plate in contact with the semiconductor layer, (c) a gadolonium (Gd) converter layer in contact with the glass plate opposite the semiconductor layer, (d) a layer of silicon PIN (p-type/intrinsic/n-type) material of suitable thickness for detecting electrons emitted from neutrons captured by the Gd converter layer in contact with the silicon PIN layer opposite the glass plate, (e) a cathode contact in electrical contact with the glass plate, (f) a first anode contact in contact with the semiconductor layer, (g) a second anode contact in contact with the silicon PIN layer, and (h) a processor in electric contact with the first and second anode contacts. The processor is configured to cooperate with the anode contacts and the cathode contacts to establish electric fields across the semiconductor layer and the Si PIN layer, and is configured to differentiate between signals generated by a neutron event and signals generated by a gamma-ray event.

The semiconductor material may include any of cadmium-zinc-telluride (CdZnTe), high-resistivity gallium arsenide (GaAs), and high purity germanium (HPGe).

The detector may further include a printed circuit board (PCB) in electrical contact with respective ones of the first and second anode contacts to connect the first and second anode contacts to respective contacts in respective processors. A plurality of adjacent spaced-apart detectors may share a common PCB.

The first and second anode contacts may be divided into an array of pixels. The semiconductor layer may include cadmium-zinc-telluride (CdZnTe) and may be separated into pixels aligned with pixels in the Si PIN layer.

The semiconductor layer may have a thickness of 0.35 cm, the glass plate may have a thickness of at least 300 µm, the Gd layer may have a thickness of 5 µm, and the Si Pin layer may have a thickness of 280 µm. Alternatively, the semiconductor layer may have a thickness of 1.0 cm or 1.5 cm or 2.0 cm.

The present invention further provides a controller for use with a common detector for both gamma-rays and neutrons, where the detector includes a semiconductor layer including a semiconductor material suitable for capturing gamma-rays, a glass plate in contact with the semiconductor layer, a gadolonium (Gd) converter layer in contact with the glass plate opposite the semiconductor layer, a layer of silicon PIN (p-type/intrinsic/n-type) material of suitable thickness for detecting electrons emitted from neutrons captured by the Gd converter layer in contact with the silicon PIN layer, a cathode contact in electrical contact with the glass plate, a first anode contact in contact with the semiconductor layer, and a second anode contact in contact with the silicon PIN layer. The controller includes a processor configured to cooperate with the first anode, the second anode and the cathode to establish an electric field across the semiconductor layer and the silicon PIN layer. The processor is configured to differentiate between signals generated by a neutron event and signals generated by a gamma-ray event as a function of coincidence testing of signals received from each of the first and second anodes.

The present invention also provides a detector for both gamma rays and neutrons that includes (a) means for capturing gamma-rays that produces an electron, (b) means for capturing neutrons that produces an electron, (c) means for separating electrons generated by the means for capturing gamma rays from the electrons generated by the means for capturing neutrons, (d) means for applying an electric field across the means for capturing neutrons and the means for capturing gamma rays, and (e) means for differentiating between signals generated by a neutron event and signals generated by a gamma-ray event.

The means for capturing gamma-rays may include a semiconductor layer having a semiconductor material suitable for capturing gamma-rays.

The means for capturing gamma-rays may include a layer of crystallized cadmium-zinc-telluride (CdZnTe) (CZT).

The means for capturing neutrons that produces an electron may include a gadolonium (Gd) converter layer for capturing neutrons and producing an electron and a layer of silicon PIN (p-type/intrinsic/n-type) material of suitable thickness in contact with the Gd converter layer for detecting the electron The means for separating electrons generated by the means for capturing gamma rays from electrons generated by the means for capturing neutrons may include a glass plate.

The (d) means for applying an electric field across the means for capturing neutrons and the means for capturing gamma rays may include (1) a cathode contact in electrical contact with the separating means, (2) a first anode contact in contact with the gamma-ray capturing means, (3) a second anode contact in contact with the neutron capturing means, and (4) a processor in electric contact with the first and second anode contacts. The processor may be configured to cooperate with the first and second anode contacts and the cathode contacts to establish an electric field across the means for capturing neutrons and the means for capturing gamma rays.

The means for differentiating between signals generated by a neutron event and signals generated by a gamma-ray event may include a processor in electric contact with the means for establishing an electric field across the means for capturing neutrons and the means for capturing gamma rays. The processor is configured to differentiate between signals generated by a neutron event and signals generated by a gamma-ray event.

The foregoing and other features of the invention are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages and features of the invention will become apparent from the following detailed description of the invention when considered in conjunction with the drawings.

DETAILED DESCRIPTION

As noted above, the present invention provides a combined neutron and gamma-ray detector and method that employs a coincidence test for pulses in two different detection materials to detect both thermal or near-thermal neutrons and gamma rays.

The detector combines two different detector materials in a common structure, one of which provides a means for capturing gamma-rays that produces an electron, and the other of which provides a means for capturing neutrons that produces an electron. The detector further includes means for separating the electrons generated by the respective means for capturing gamma-rays and the means for capturing neutrons. The detector also includes means for establishing an electric field across each of the means for capturing gamma-rays and the means for capturing neutrons. And the detector includes means for differentiating between signals generated by a neutron event and signals generated by a gamma-ray event.

An exemplary means for capturing gamma-rays includes a layer of semiconductor material configured to capture gamma rays, such as Cadmium-Zinc-Telluride (CdZnTe) (referred to as CZT), which is available from eV Microelectronics of Saxonburg, Pa., U.S.A., for example. An exemplary means for capturing neutrons includes a layer of a gadolonium (Gd), referred to as a Gd converter layer. The Gd converter layer produces an electron when a neutron is captured, and the electron is then detected in a layer of silicon PIN (p-type/intrinsic/n-type) material of suitable thickness. The detector also includes a controller connected to the layers of detector materials that provides a means for establishing electric fields across the CZT layer and the Si PIN layer, and uses a coincidence test to check for pulses occurring in the two material layers and differentiates between signals generated to determine whether a pulse is the result of a neutron or a gamma ray.

Figure 1:
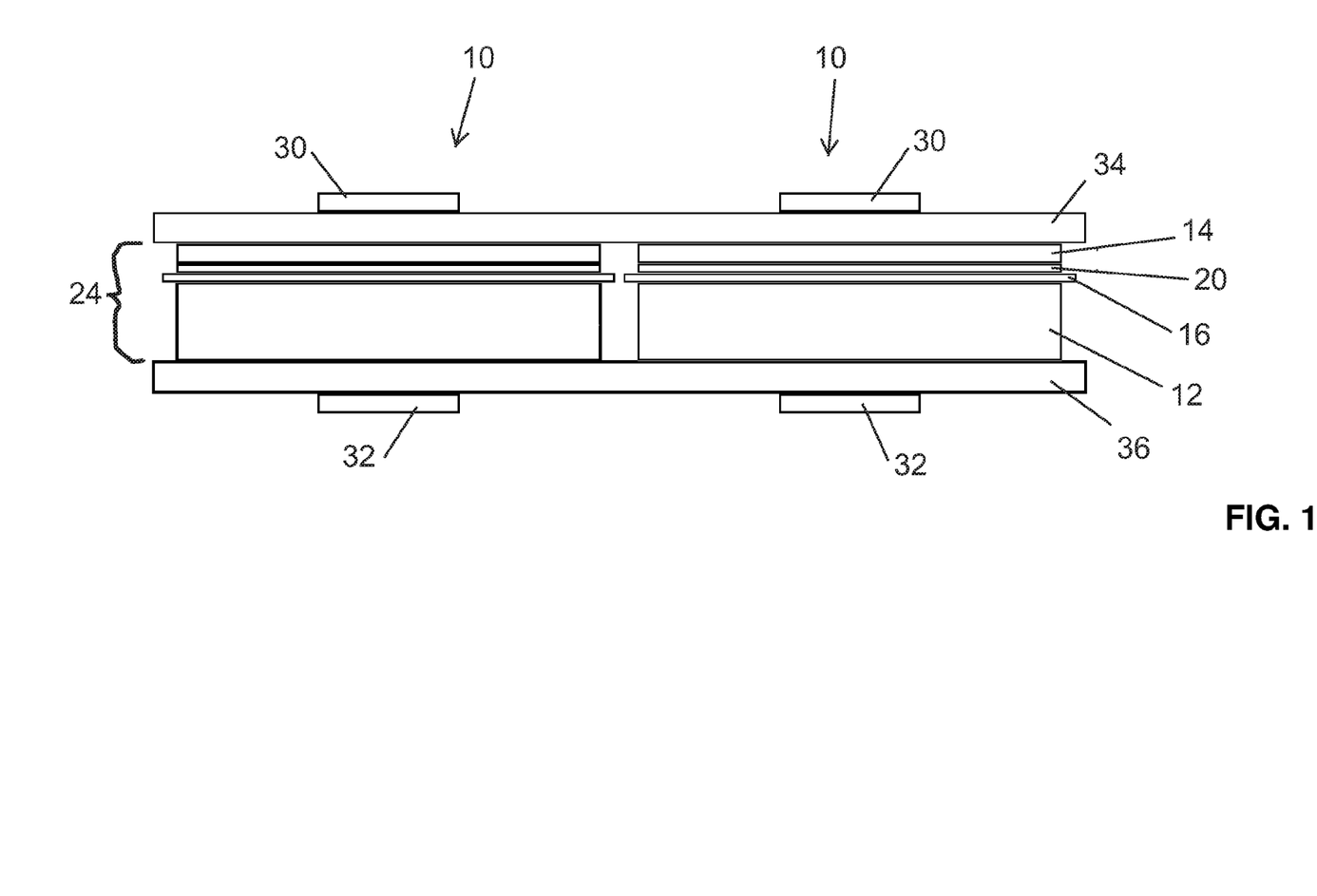
FIG. 1 is a schematic cross-section of a combined neutron and gamma-ray detector provided by the invention.

Turning now to the drawings in detail, and starting with FIG. 1, an exemplary detector 10 for detecting both gamma-rays and neutrons is shown. The detector 10 has a compact all-solid-state structure that includes a series of layered elements that form a common detector assembly. Although the illustrated embodiment includes two detector assemblies, the detector 10 could function with just one or any reasonable number of detector assemblies. The detector assemblies are identical, and reference to either a detector 10 or to a detector assembly generally will be equivalent.

Each detector 10 includes a layer of semiconductor material 12 suitable for capturing gamma-rays, such as a layer of Cadmium-Zinc-Telluride (CdZnTe) (CZT), aligned with a layer of silicon (Si) PIN (silicon p-type/intrinsic/n-type) 14 of the same area and having a suitable thickness for detecting electrons produced by neutrons, as further described below. Although the illustrated embodiment will be described with reference to the CZT layer 12, other semiconductor materials may be used in place of CZT, including high-resistivity gallium arsenide (GaAs) and high purity germanium (HPGe). The CZT layer 12 is relatively thick compared to the other layers. The CZT layer 12, because of its composition of relatively heavy atoms and thick configuration, is sensitive to gamma rays, including those not connected with a neutron capture, as well as those resulting from a neutron capture.

In contrast to the CZT layer 12, the Si PIN layer 14 is relatively insensitive to gamma rays because of its composition of relatively light atoms and thin configuration. A glass plate 16 or other insulating material in contact with the CZT layer 12 isolates and separates the Si PIN layer 14 from the CZT layer 12. The glass plate 16 separating the CZT and Si PIN layers 12 and 14 generally is relatively thin in comparison but has sufficient thickness to provide means for separating electrons generated in the CZT layer 12 from electrons detected in the Si PIN layer 14. The glass plate 16 prevents electrons from traveling between the CZT layer 12 and the Si PIN layer 14.

The means for capturing neutrons includes a gadolinium (Gd) converter layer (Gd layer 20). The Gd layer 20 is relatively thin and lies adjacent to the glass plate 16 separating the Gd layer 20 and the CZT layer 12. Thus the Gd layer 20 is in contact with one side of the glass plate 16 opposite the CZT layer 12, between the Si Pin layer 14 and the glass plate 16. An exemplary Gd layer 20 is a 5-μm layer of Gadolinium-157 ($^{157}$Gd). The Gd layer 20 absorbs neutrons with high efficiency and consequently emits energetic electrons and gamma rays. The electrons naturally travel a much shorter path than the gamma rays. The Si PIN layer 14 is sensitive to the internal conversion electrons caused by a neutron capture in the adjacent Gd layer 20. The glass plate 16 prevents the electrons in the Gd layer 20 from registering in the CZT layer 12, which makes it easier to distinguish between events indicating neutron capture compared to events indicating the presence of gamma rays.

Figure 2:
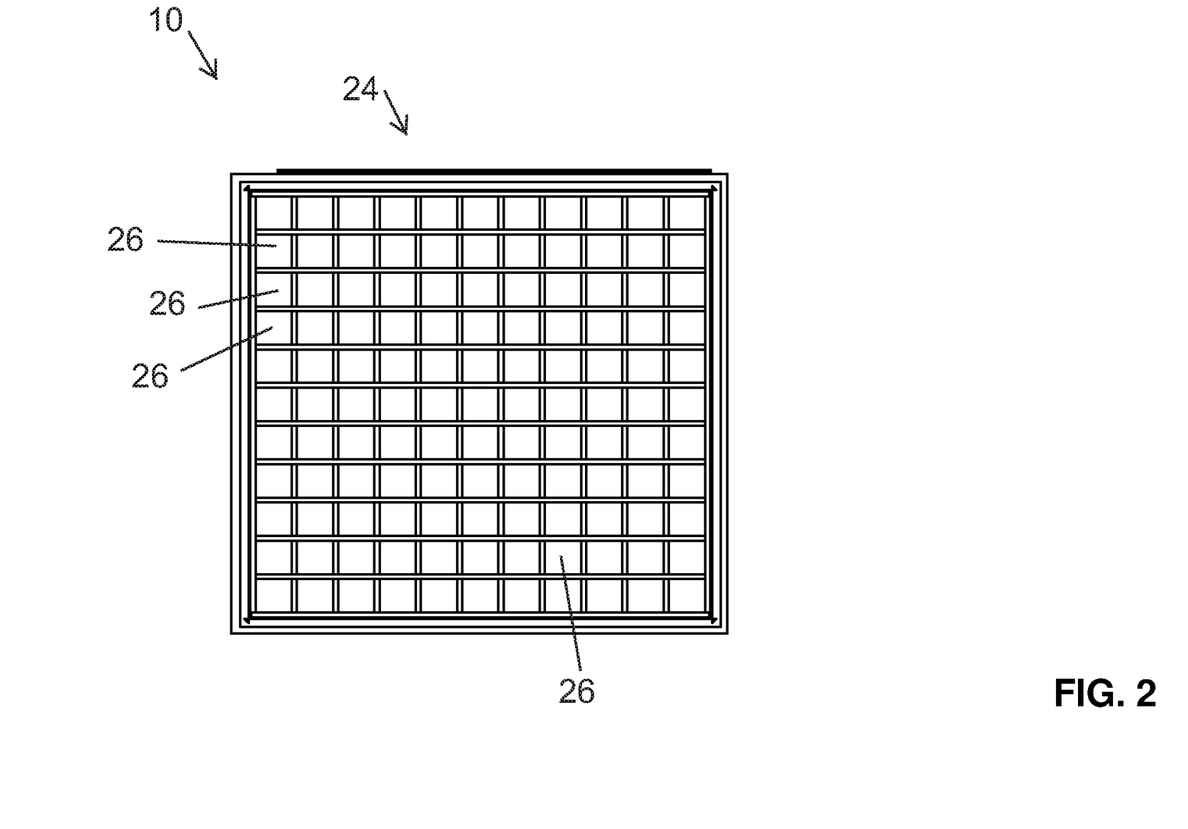
FIG. 2 is a top view of the detector of FIG. 1.

Each CZT/Si PIN assembly 24, including the foregoing layers 12, 14, 16, and 20, has an array of anode contacts that separate the CZT/Si PIN assembly 24 into pixel areas or pixels 26, as shown in FIG. 2, for example. The CZT/Si PIN assemblies 24 are sandwiched between a pair of controllers 30 and 32 with logic instructions encoded as software or hard-wired. Each controller 30 and 32 typically has at least one processor or Central Processing Unit (CPU), together with an associated memory for storing an operating system, application software, and data generated by events in the detector 10. The controller 30 or 32 may include an analog-to-digital signal processor or converter, and may be connected to input and output devices in a well known manner.

Multi-layer printed circuit boards (PCBs) 34 and 36 cooperate with the associated controller 30 and 32 to connect each pixel area 26 of the CZT/Si PIN assembly 24 to a respective contact on the respective processor. The processor may include two or more silicon-based application-specific integrated circuits (ASICs) that drive the CZT and Si PIN layers 12 and 14. To that end, first and second anode contacts are coupled to the processors or PCBs 34 and 36, in electric contact with respective outer surfaces of the CZT layer 12 and the Si PIN layer 14. Traces on the PCBs 34 and 36 connect the anodes to the corresponding unit cells of the ASICs or other processors. The processors also are coupled to and in electric contact with cathode contacts, adjacent to and in electric contact with the glass plate 16. Thus the electrodes, the anodes and the cathodes, are connected to the processors in respective controllers 30 and 32. The controller 30 and 32 controls the application of the electric field to the CZT/Si PIN assembly 24 through the anodes and the cathodes. The potential difference between the anode and cathode contacts, controlled by the controller 30 and 32, establishes an electric field within each detection material (the CZT and Si PIN layers 12 and 14). The controller 30 and 32, and more specifically the associated processors, also receives and analyzes electrical signals received at the anodes and the cathodes using coincidence criteria to identify neutron events and gamma-ray events and to distinguish between them. Put another way, the processor of each controller 30 and 32 is configured to differentiate between signals generated by a neutron event and signals generated by a gamma-ray event as a function of coincidence testing of signals received from each of the first and second anodes.

Although the detector 10 is not primarily intended for imaging, advantages of the pixel approach include:

1) the ability to turn off defective pixels 26, greatly increasing the yield of usable CZT material and reducing cost;

2) the use of multiple independent detectors 10 operating in parallel reduces dark current, capacitance, and pulse pile-up;

3) aligned CZT/Si PIN pixel pairs facilitate coincidence testing; and 4) the CZT/Si PIN assembly 24 topologically conforms to an existing ASIC that can perform depth correction calculations that improve gamma-ray energy resolution in the CZT layer 12. In the exemplary embodiment described here, as many as 12 pixels (worst case) out of 242 can be turned off and still meet a desired minimum efficiency, thereby increasing the yield of usable CZT material.

In an exemplary embodiment, each CZT layer 12 may be formed of a 3 cm×3 cm square chip, providing a total sensitive area of A=18 cm$^2$, separated into pixels 26. Each CZT/Si PIN assembly 24 may have an 11×11 array of anode contacts such as is illustrated in FIG. 2, creating 121 pixels per chip (242 pixels total). This arrangement forms 242 pixels 26 in each CZT/Si PIN assembly 24, and each pixel 26 in the Si PIN layer 14 is aligned with a pixel 26 in the CZT layer 12. Each pixel 26 independently detects neutrons and gamma rays. Individual defective pixels can be turned off via the controllers 30 and 32, significantly increasing the yield of usable CZT material, which is typically more expensive. An exemplary pixel pitch is 2.6 mm, with a 0.7 mm setback at the outer edge (around the periphery).

As mentioned above, neutron detection is achieved through the gadolinium conversion layer (Gd layer 20) on the glass plate 16. An exemplary Gd layer 20 has a thickness of about 5 μm. For a 254,000 barn cross-section of $^{157}$Gd (where a barn is defined as $10^{-28}$ m$^2$), the absorption rate in enriched elemental Gd is 7682 cm$^{-1}$. Thus a 5 μm Gd layer thickness will be expected to capture 98% of all impinging thermal neutrons. Efficiency can be increased by increasing the thickness of the Gd layer 20, but that increased thickness comes with a corresponding increase in cost.

And as mentioned above, gamma-ray detection is achieved via the CZT layer 12. For a thickness of d=0.35 cm, the CZT layer 12 has a total volume of 6.30 cm$^3$. Using Harmonex software from Aprend Technology, available via www.aprendtech.com/OverView.html, the cross-section for photoelectric interaction of a 1.17 MeV gamma ray in a 0.35 cm-thick CZT layer 12 is about 0.002456 cm$^2$/g. Given a density of 5.845 g/cm$^3$, the absorption rate in the CZT layer 12 is then about 0.01436 cm$^{-1}$. Although this example uses a CZT layer 12 that has a thickness of 0.35 cm, the sensitivity to gamma rays can be significantly improved by increasing the thickness to 1.0 cm, or 1.5 cm, or 2.0 cm, for example.

In optimizing the design of the detector, multiple parameters may be adjusted, including Gd layer 20 thickness, Si PIN layer 14 characteristics, CZT layer 12 thickness, glass plate 16 thickness, bias voltages, controller 30 and 32 operating conditions, and pixel coincidence criteria. The exemplary example described here is but one configuration.

Turning now to a description of the method of detecting neutrons and gamma rays using a common detector 10, where the detector includes a layer of semiconductor material (such as CZT) 12 adjacent a glass plate 16 a layer of silicon PIN material 14 on an opposite side of the glass plate 16 and a Gd layer 20 between the glass plate 16 and the silicon PIN layer 14 to form a subassembly that is bounded by electrodes, including a semiconductor or first anode on one side of the semiconductor material, a cathode connected to the glass plate, and a Si PIN or second anode on a side of the Si PIN layer opposite the semiconductor anode. The method includes detecting electrons in the CZT layer 12 or the Si PIN layer 14, and determining whether electrons were detected in both the CZT and the Si PIN layers 12 and 14 at about the same time, i.e. coincidentally. Consequently the method may be referred to as including a coincidence test. More particularly, the method includes the steps of (1) monitoring the electrical signal at each of the semiconductor anode and the Si PIN anode, and (2) comparing signals from the semiconductor anode and the SI PIN anode to differentiate between gamma-ray events and neutron events based on predetermined criteria, described in further detail below. The method further includes establishing an electric field within each of the CZT and the Si PIN layers 12 and 14 by generating a potential difference between the anode and cathode contacts. The method also may include the step of providing a common gamma-ray and neutron detector with a controller connected to the anodes and the cathode, the controller including a processor and a memory.

Through the photoelectric effect, a gamma ray deposits all of its energy in the CZT layer 12, generating a proportional number of electron-hole pairs. In an applied electric field, the electrons and holes drift toward their respective anode and cathode contacts, ideally generating a signal proportional to the gamma-ray energy. Because of trapping effects, however, not all of the charge is collected. This problem has been substantially overcome with the 3-D position-sensing technology that has been implemented in the HPL2 ASIC, developed at Brookhaven National Laboratory in Long Island, N.Y., US, making it an exemplary controller 30 and 32.

Figure 3A:
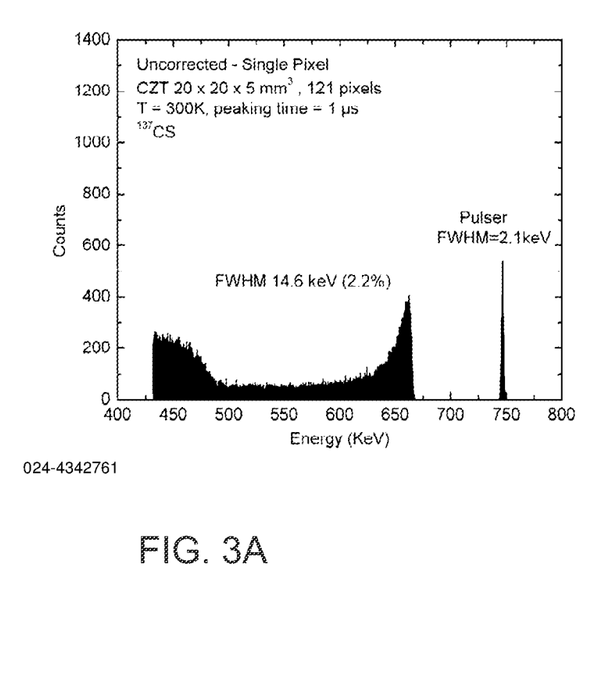
FIGS. 3A and 3B are graphical representations of gamma ray energy resolution in the detector.
Figure 3B:
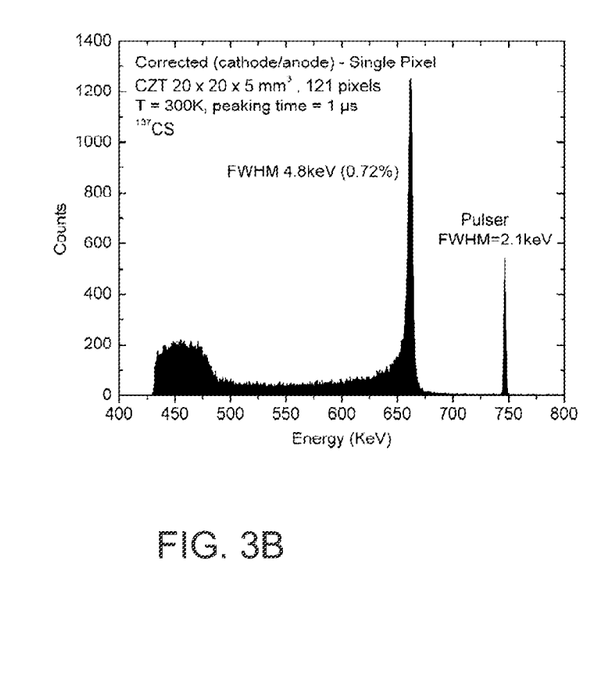

Each individual gamma event is corrected in amplitude according to the depth in the CZT layer 12 at which the charge was generated. FIGS. 3A and 3B show an example of how the 662 keV peak of $^{137}$Cs has been sharpened from 2.2% to 0.72% full width at half maximum (FWHM) using the 3-D technique mentioned above. An estimate of the width expected at 1.17 MeV, scaling this by the square root of the ratio of the gamma ray energies, leads to a linewidth of 0.54%. To be conservative, this can be doubled to predict a linewidth of 1.15%. Most of the other gamma-ray events will consist of Compton scattering, creating a broad background, especially if the ambient gamma field contains a variety of energies. Photoelectric gamma events, given reasonable statistics, will stand out above this background because of their narrow lines.

Neutrons are detected by catching internal conversion electrons in the Si PIN layer 14. The neutrons are first captured in the Gd layer 20, producing the electrons that escape to the Si PIN layer 14. Neutron capture by $^{157}$Gd is represented by $^{157}$Gd(n,γ+e$^-$+x)$^{158}$Gd, in which the final nucleus, $^{158}$Gd, relaxes to its ground state by releasing 7.9 MeV of energy in a complex mixture of gamma rays, internal conversion (IC) electrons, and x-rays. Typically more than three gamma rays emerge in each neutron capture. The most probable energies occur at 79.51 and 181.94 keV, with others between 0.606 and 6.75 MeV. All of these are unlikely to register in the Si PIN layer 14 because of the low atomic number of the Si PIN material and the relatively thin (typically 280 μm) thickness of the Si PIN layer 14. In comparison, prominent energies of the IC electrons are 79.51, 181.94, 255.67, and 277.55 keV, all of which have a small enough projected range to be fully stopped in the Si PIN layer 14. On average they will lose minimal energy emerging from the Gd layer 20 before entering the Si PIN layer 14.

Figure 4:
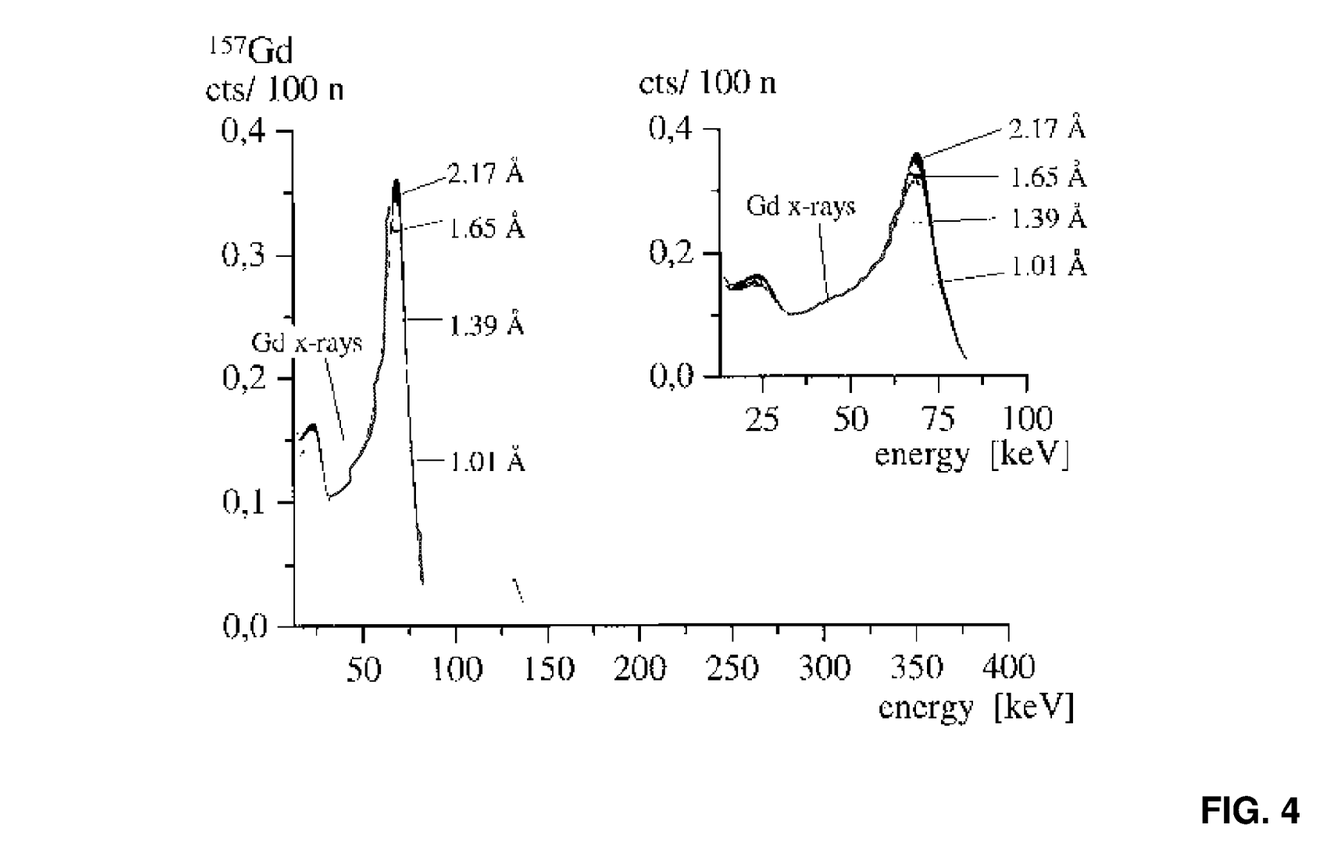
FIG. 4 is a graphical representation of the energy spectrum of internal conversion electrons due to neutrons received in the detector.

FIG. 4 is an actual spectrum of the IC electrons produced due to neutrons being captured in the Gd layer 20. (The angstrom notations represent the kinetic energy of the thermal neutrons.) Energy spectroscopy of the IC electrons can be performed in the Si PIN layer 14, in the same manner as gamma rays in the CZT layer 12, but without any need to correct for trapping. One electron-hole pair is created in the Si PIN layer 14 for each 3.6 eV of IC electron energy, so each pulse will be much greater than the dark current charge collected within pulse shaping time.

Figure 5:
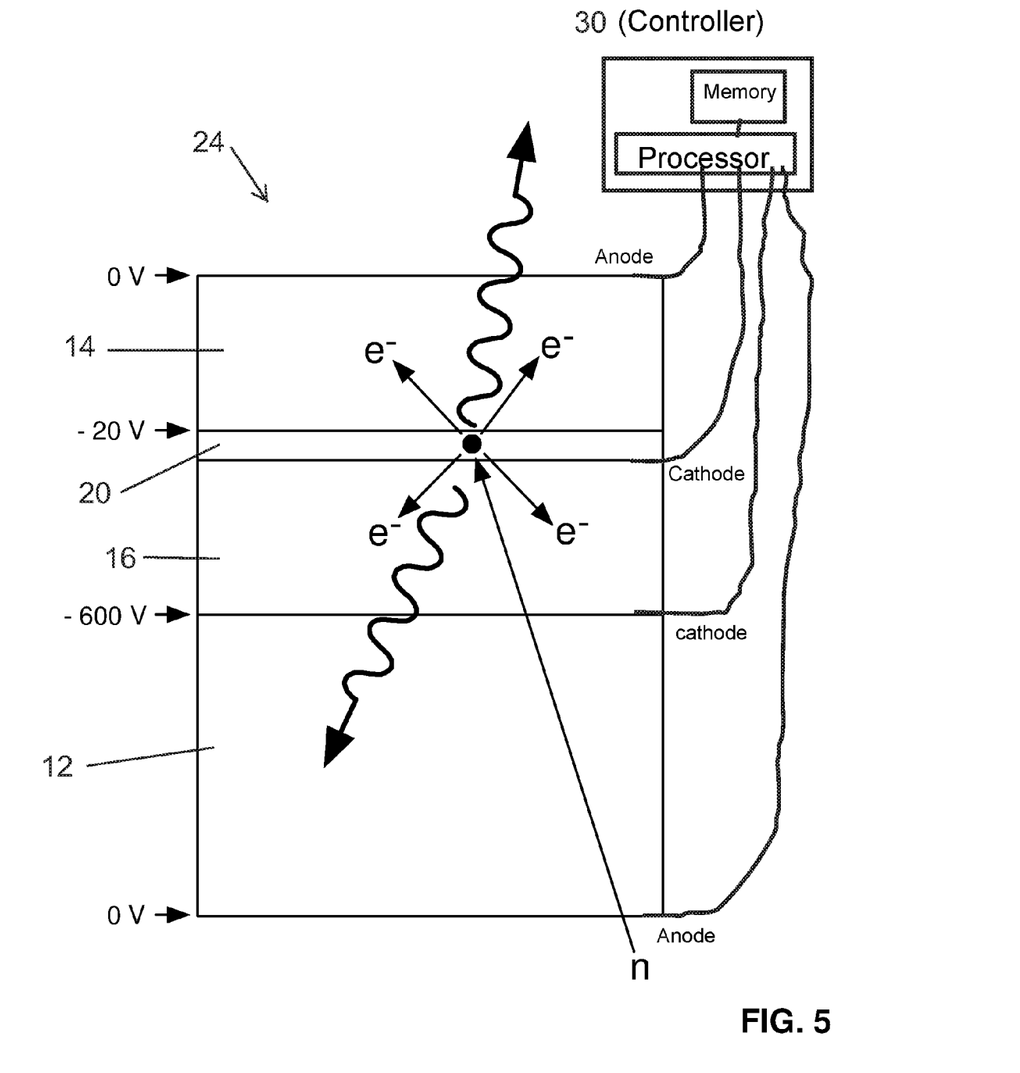
FIG. 5 is a schematic cross-section of a portion of the detector illustrating a neutron event.

FIG. 5 illustrates the capture of a neutron in the detector 10. The approximate cathode-to-anode biases are 600V and 20V across the CZT and Si PIN layers 12 and 14, respectively.

The glass layer 16, generally at least 300 μm thick, functions: (1) to stand off the potential difference between the Si PIN and CZT cathodes, (2) to form a substrate for the Gd layer 20, (3) to stop IC electrons emitted by the Gd layer 20 from entering the CZT layer 12, and (4) to reduce the number of Compton-scattered electrons from the CZT layer 12 that enter the Si PIN layer 14. Additionally, a thinner (5 μm) enriched, rather than a thicker natural Gd layer 20 is advantageous because it will interact less with the gamma ray field and will permit easier escape of the IC electrons. The enriched Gd layer 20 also emits a simpler IC electron spectrum than the natural isotopic mixture.

For each event, the detector 10 provides six pieces of information: (1) pulse amplitude in the CZT layer 12 (if any); (2) pulse amplitude in the Si PIN layer 14 (if any); (3,4) timing of the CZT layer 12 and Si PIN layer 14 signals; and (5,6) the pixel locations in the CZT and Si PIN arrays. The spectroscopy performed with the Si PIN layer 14 is not done to reveal the neutron's kinetic energy, but to identify the IC electrons. The manner in which these quantities are interpreted may be optimized before assigning an event to a neutron or to a gamma ray with the highest confidence. For example, a pulse occurring in the Si PIN layer 14 with no CZT layer 12 coincidence is most likely generated by a neutron, as long as the energy is compatible with the known IC electron spectrum. A coinciding event in the CZT layer 12, especially in a nearby pixel 26, assumed to represent a gamma ray event from the Gd layer 20, would confirm a neutron event. Because of timing, the amplitude could be ignored, allowing either Compton scattering or photoelectric capture of the Gd-originated gamma ray in the CZT layer 12 to help confirm the neutron.

For gamma detection, a pulse in the CZT layer 12 with the absence of a coincident signal in the Si PIN layer 14, especially in neighboring pixels 26, would most likely indicate a gamma ray.

Accordingly, when the anodes are at zero volts, the glass plate 16 stands off the potential difference between the two cathodes (negative voltages indicated). Internal conversion electrons easily escape from the Gd layer 20 and deposit their energy in the Si PIN layer 14. If emitted in the other direction, the glass plate 16 prevents the IC electrons from registering in the CZT layer 12. Gamma rays from the same neutron event, if emitted downward, can be detected by the CZT layer 12. Because of the CZT-Si PIN coincidence test, both Compton scattering and photoelectric absorption of gamma rays in the CZT layer 12 can be used to help confirm the presence of a neutron event.

In summary then, the present invention provides a method for detecting both gamma-ray events and neutron events with a common detector, where the detector includes a layer of semiconductor material adjacent one side of a glass plate and a Gd layer on an opposite side of the glass plate, between the glass plate and a layer of silicon PIN material to form an assembly that is bounded by electrodes, including a semiconductor anode on one side of the semiconductor layer, a cathode connected to the glass plate, and a Si PIN anode on a side of the Si PIN layer opposite the semiconductor anode. The method includes the steps of: (1) monitoring the electrical signal at each of the semiconductor anode and the Si PIN anode, and (2) comparing signals from the semiconductor anode and the SI PIN anode to differentiate between gamma-ray events and neutron events based on predetermined criteria.

Although the invention has been shown and described with respect to a certain preferred embodiment, it is obvious that equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention can have been disclosed with respect to only one of the several embodiments, such feature can be combined with one or more other features of the other embodiments as may be desired and advantageous for any given or particular application.

The invention claimed is:

1. A detector for both gamma-rays and neutrons, comprising:
   a semiconductor layer including a semiconductor material suitable for capturing gamma-rays;
   a glass plate in contact with the semiconductor layer;
   a gadolonium (Gd) converter layer in contact with the glass plate opposite the semiconductor layer for capturing neutrons;
   a layer of silicon PIN (p-type/intrinsic/n-type) material of suitable thickness in contact with the Gd converter layer opposite the glass plate to detect electrons produced by neutrons captured in the Gd converter layer;
   a cathode contact in electrical contact with the glass plate;
   a first anode contact in contact with the semiconductor layer;
   a second anode contact in contact with the silicon PIN layer; and
   a processor in electric contact with the first and second anode contacts, the processor being configured to cooperate with the anode contacts and the cathode contacts to establish electric fields across the semiconductor layer and the Si PIN layer, and being configured to differentiate between signals generated by a neutron event and signals generated by a gamma-ray event.

2. A detector as set forth in claim 1, where the semiconductor material includes any of cadmium-zinc-telluride (CdZnTe), high-resistivity gallium arsenide (GaAs), and high purity germanium (HPGe).

3. A detector as set forth in claim 1, further comprising a printed circuit board (PCB) in electrical contact with respective ones of the first and second anode contacts to connect the first and second anode contacts to respective contacts in respective processors.

4. A plurality of adjacent spaced-apart detectors as set forth in claim 3, with a plurality of detectors sharing common PCBs.

5. A detector as set forth in claim 1, where the first and second anode contacts are divided into an array of pixels.

6. An array of detectors as set forth in claim 1.

7. A detector as set forth in claim 1, where the semiconductor layer includes cadmium-zinc-telluride (CdZnTe) and is separated into pixels aligned with pixels in the Si PIN layer.

8. A detector as set forth in claim 1, where the semiconductor layer has a thickness of 0.35 cm, the glass plate has a thickness of at least 300 μm, the Gd layer has a thickness of 5 μm, and the Si PIN layer has a thickness of 280 μm.

9. A detector as set forth in claim 1, where the semiconductor layer has a thickness of 1.0 cm or 1.5 cm or 2.0 cm.

10. A controller for use with a common detector for both gamma-rays and neutrons including a semiconductor layer including a semiconductor material suitable for capturing gamma-rays, a glass plate in contact with the semiconductor layer, a gadolonium (Gd) converter layer in contact with the glass plate opposite the semiconductor layer for capturing neutrons, a layer of silicon PIN (p-type/intrinsic/n-type) material of suitable thickness in contact with the Gd converter layer opposite the glass plate for detecting electrons produced from a neutron captured in the Gd converter layer, a cathode contact in electrical contact with the glass plate, a first anode contact in contact with the semiconductor layer, and a second anode contact in contact with the silicon PIN layer, the controller comprising:
   a processor configured to cooperate with the first anode, the second anode and the cathode to establish an electric field across the semiconductor layer and the silicon PIN layer; and the processor is configured to differentiate between signals generated by a neutron event and signals generated by a gamma-ray event as a function of coincidence testing of signals received from each of the first and second anodes.

11. A method for detecting both gamma-ray events and neutron events with a common detector, the detector including a layer of semiconductor material adjacent a glass plate, a gadolinium (Gd) converter layer adjacent an opposite side of the glass plate, and a layer of silicon PIN material in contact with the Gd converter layer on an opposite side of the glass plate to form a subassembly that is bounded by electrodes, including a semiconductor anode on one side of the semiconductor layer, a cathode connected to the glass plate, and a Si PIN cathode on a side of the Si PIN layer opposite the semiconductor anode, the method comprising the steps of:
   monitoring the electrical signal at each of the semiconductor anode and the Si PIN cathode; and
   comparing signals from the semiconductor anode and the Si PIN cathode to differentiate between gamma-ray events and neutron events based on predetermined criteria.

12. A method as set forth in claim 11, comprising the step of establishing an electric field within the semiconductor layer and the Si PIN layer.

13. A method as set forth in claim 11, including the step of providing a common gamma-ray and neutron detector with a controller connected to the first and second anodes and the cathode, the controller including a processor and a memory.

14. A detector for both gamma rays and neutrons, comprising:
   means for capturing gamma-rays that produces an electron;
   means for capturing neutrons that produces an electron;

means for separating electrons generated by the means for capturing gamma rays from the means from electrons generated by the means for capturing neutrons;

means for establishing an electric field across the means for capturing neutrons and the means for capturing gamma rays; and means for differentiating between signals generated by a neutron event and signals generated by a gamma-ray event.

15. A detector as set forth in claim 14, where the means for capturing gamma-rays includes a semiconductor layer having a semiconductor material suitable for capturing gamma-rays.

16. A detector as set forth in claim 15, where the means for capturing gamma-rays includes a layer of crystallized cadmium-zinc-telluride (CdZnTe) (CZT).

17. A detector as set forth in claim 14, where the means for capturing neutrons that produces an electron includes a gadolonium (Gd) converter layer for capturing neutrons and producing an electron and a layer of silicon PIN (p-type/intrinsic/n-type) material of suitable thickness in contact with the Gd converter layer for detecting the electron.

18. A detector as set forth in claim 14, where the means for separating electrons generated by the means for capturing gamma rays from electrons generated by the means for capturing neutrons includes a glass plate.

19. A detector as set forth in claim 14, where the means for applying an electric field across the means for capturing neutrons and the means for capturing gamma rays includes:
- a cathode contact in electrical contact with the separating means;
- a first anode contact in contact with the gamma-ray capturing means;
- a second anode contact in contact with the neutron capturing means; and
- a processor in electric contact with the first and second anode contacts, the processor being configured to cooperate with the first and second anode contacts and the cathode contacts to establish an electric field across the means for capturing neutrons and the means for capturing gamma rays.

20. A detector as set forth in claim 14, where the means for differentiating between signals generated by a neutron event and signals generated by a gamma-ray event includes a processor in electric contact with the means for establishing an electric field across the means for capturing neutrons and the means for capturing gamma rays, the processor being configured to differentiate between signals generated by a neutron event and signals generated by a gamma-ray event.

* * * * *